Jan. 17, 1928.

H. E. VANDERVEER

VEHICLE SPOTLIGHT

Filed Aug. 8, 1924

Inventor

H. E. Vanderveer

By Lloyd W. Patch
Attorney

Jan. 17, 1928.  1,656,457
H. E. VANDERVEER
VEHICLE SPOTLIGHT
Filed Aug. 8, 1924   3 Sheets-Sheet 2
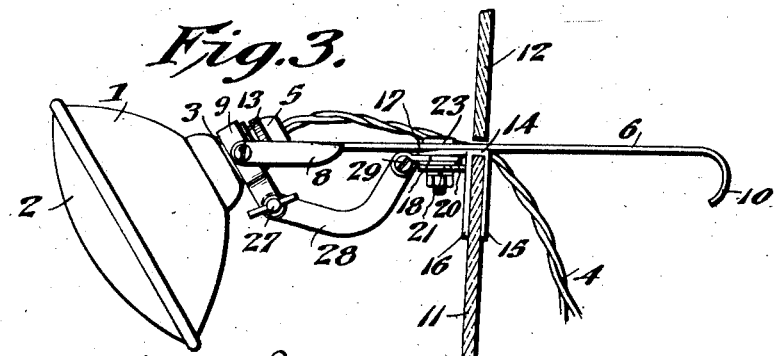
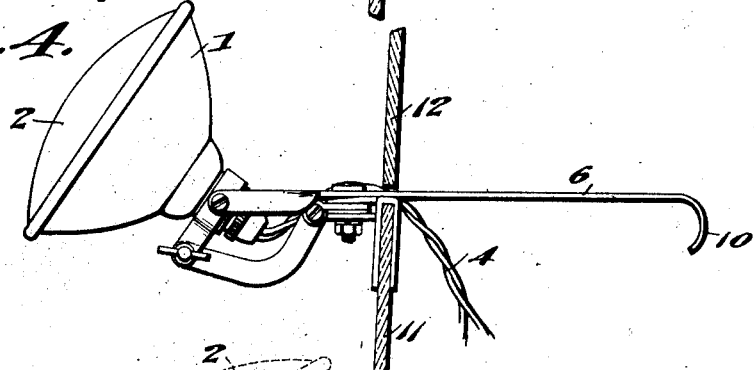
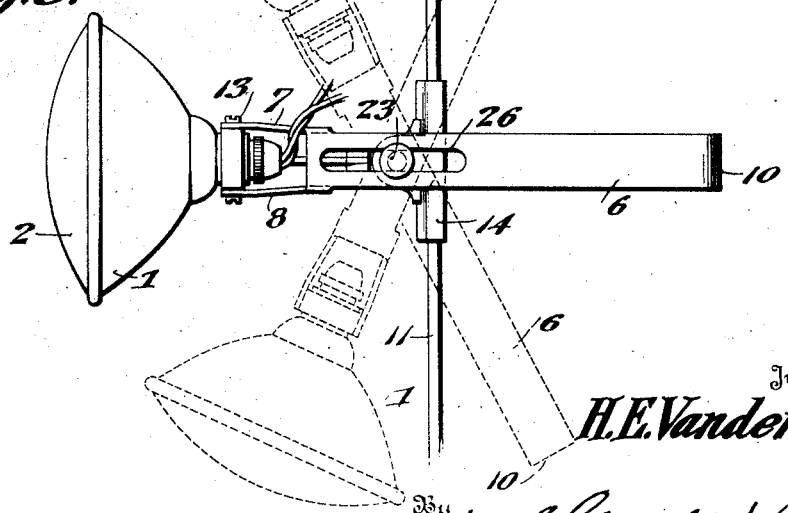
Inventor
H. E. Vanderveer Jan. 17, 1928.
H. E. VANDERVEER
1,656,457
VEHICLE SPOTLIGHT
Filed Aug. 8, 1924    3 Sheets-Sheet 3
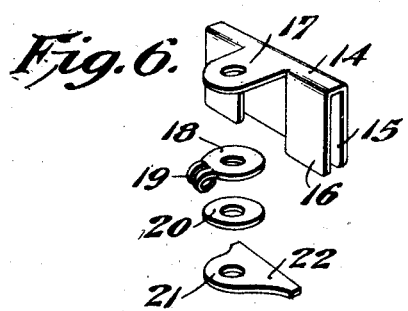
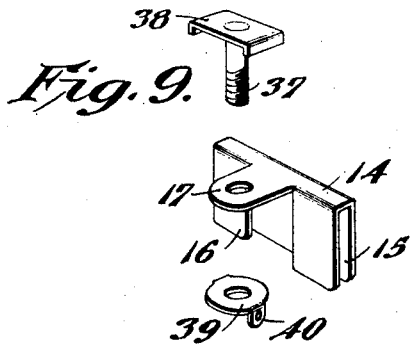
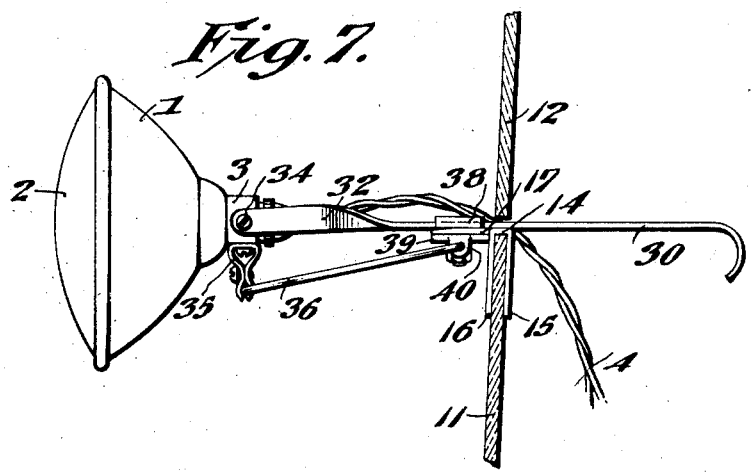
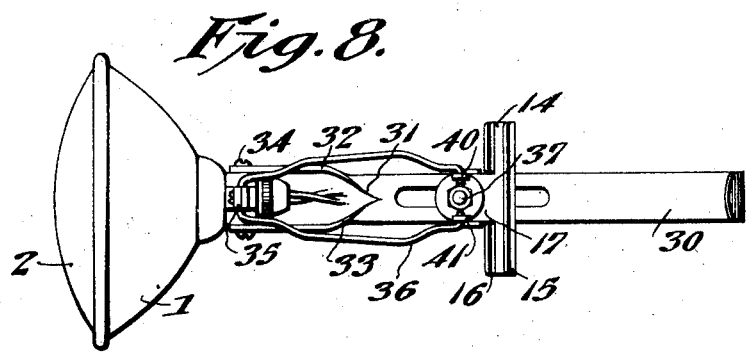
Inventor
H. E. Vanderveer
By Lloyd W. Batch
Attorney Patented Jan. 17, 1928.

1,656,457

UNITED STATES PATENT OFFICE.

HERBERT E. VANDERVEER, OF DENVER, COLORADO, ASSIGNOR TO THE CLYMER MANUFACTURING COMPANY, A CORPORATION OF COLORADO.

VEHICLE SPOTLIGHT.

Application filed August 8, 1924. Serial No. 730,885.

This invention relates to improvements in vehicle spotlights, and particularly to a windshield spotlight adapted to be mounted upon and supported by the windshield glass of an automobile.

An object of this invention is to provide a structure of this character which is particularly adapted for mounting upon a windshield structure having the glass in two sections.

A further object resides in so constructing the parts that a mounting clamp is provided to fit over the edge of one of the glass sections to support the spotlight with a light casing on the outer side of the windshield and a handle presented to be accessible on the inner side.

Yet another object lies in providing a mounting by which the light casing is supported for dirigible movement, so that the light rays can be projected at any angle upwardly and downwardly and laterally to either side.

A still further object is to provide a light structure which is readily and quickly mounted in place without the necessity of cutting or otherwise altering any portion of the automobile structure, and which can be instantaneously removed for use as a trouble lamp.

With the above and other objects in view, which will be apparent to those skilled in the art, my present invention includes certain novel features of construction and combinations of parts, which will be set forth in connection with the drawings, and then pointed out in the claims.

In the drawings:

Fig. 3 is a similar view showing the relation of the parts in shifting to direct the light rays downwardly.

Fig. 4 is a view similar to Fig. 3 with the lamp structure tilted to direct the rays upwardly.

Fig. 5 is a top plan view with positions of lateral adjustment indicated by dotted lines.

Fig. 6 is a perspective view showing the bearing and clamp mounting.

Fig. 7 is a view in side elevation of a modified construction of spotlight.

Fig. 8 is a view in bottom elevation of the modified structure.

Fig. 9 is a perspective view showing the bearing portions in the relation in which they will be assembled.

Figure 1:
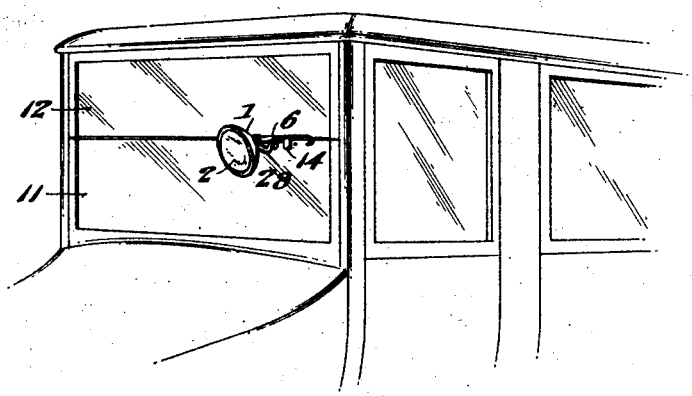
Figure 1 is a view in perspective of the upper portion of a closed automobile showing my improved spotlight applied thereto.
Figure 2:
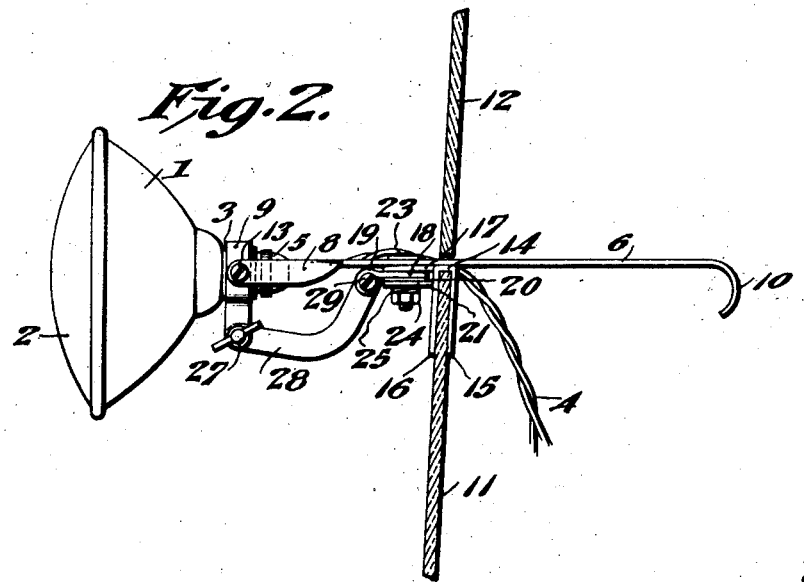
Fig. 2 is a view in elevation of the spotlight structure.

In the main embodiment, the light casing 1 has the lens or glass 2 fitted in place over the electric lamp bulb and the reflector, a stem 3 being provided on the reverse side of the case. A flexible lamp cord 4 is connected in the socket 5 by which the electric lamp is mounted, and the remaining end of this flexible lamp cord or wire is connected with a storage battery or other suitable source of current supply.

A lamp case mounting and operating handle 6 is provided with arms 7 and 8, at one end, to be pivotally connected with a clamp ring 9 adapted to receive the stem 3 on the casing 1, and at its remaining end this mounting handle has a hand portion 10. It is preferable that the handle 6 be made of sheet metal, or of other thin material, so that it will fit freely between the lower and upper sections 11 and 12 of a two-part windshield glass. The present handle is shown as made of sheet metal with the arms 7 and 8 stamped or otherwise formed integral therewith, and these arms are bent angularly to give proper bearings for pivotally mounting the clamp ring 9 on a horizontal axis, screws 13, or other suitable pivot members being provided as the bearings.

A clamp member 14, preferably made of resilient spring metal and bent up to the form best shown in Fig. 6, is provided with clamp flanges 15 and 16, adapted to be received on opposite sides of the upper edge of the lower windshield glass 11, and a bearing tongue 17 is struck up to extend forwardly from the body of the clamped portion. A bearing ring 18 having the bearing portion 19 extending laterally therefrom is adapted to be placed on the lower side of the bearing tongue 17, a friction washer 20 is located on the lower side of the bearing ring 18, and a bearing clamp member 21 adapted to be mounted on the lower side of friction washer 20 is widened out at 22 to engage against the forward side of clamp flange 16. These parts are held in assembled relation by means of a pivot bolt 23 and nut 24, it being preferable that a spring 25 be fitted between the bearing clamp member 21 and this nut 24. The handle 6 has an elongated slot 26 formed therethrough adjacent its forward end, and the pivot bolt 23 is fitted through this slot to slidably and pivotally mount the handle 6.

A clamp screw 27 is fitted through the ends of the clamp ring 9 to tighten this ring against and upon stem 3, and this clamp screw also serves as a bearing to pivotally connect the curved arm 28 with the clamp ring at a point offset laterally from the pivotal mounting of the ring on the screws 13. A pivot screw 29 connects the remaining end of arm 28 in the bearing 19 of ring 18, and this curved arm is thus connected between the clamp ring 9 and the clamp member 14 after the manner of a link.

My improved spotlight structure is mounted with the clamp 14 embracing the upper edge of the lower windshield glass 11, and the handle 6 is extended rearwardly between the upper and lower glasses with the hand-grip portion 10 thereof presented on the inner side of the windshield, the bearing bolt 23 and the light casing 1 being disposed on the outer side of the windshield glass. To direct the light rays downwardly, handle 6 is pushed forwardly, as illustrated in Fig. 3, and the curved arm or link 28 connected with the lateral arms or ends of clamp ring 9 causes the lamp case to be swung with the lens 22 directed downwardly at an angle. The light rays are projected outwardly by drawing in on the handle 6, and to facilitate such movement, it is preferable that the handgrip portion 10 be formed as a hook. As the handle 6 is loosely received between the lower and upper glasses of the windshield, the handle 6 can be grasped by the operator of the vehicle and swung laterally around pivot bolt 23 to direct the lamp rays at an angle laterally on either side of the vehicle, after the manner indicated by the dotted lines in Fig. 5. The friction washer 20 will serve to hold lateral adjustments of the handle, and the spring washer 25 draws the head of pivot bolt 23 down to frictionally engage the handle on opposite sides of the elongated slots 26, so that this handle is held in various positions to which it is adjusted longitudinally.

With the construction shown in Figs. 7, 8 and 9, the handle 30 is bifurcated or split at its outer end 31 and the split ends are twisted to provide bearing arms 32 and 33. These bearing arms have pivotal connection with the stem 3 of the light casing through screws 34, or other suitable pivot members. A bearing arm 35 is secured on the lower side of the stem 3 and has a bearing at its end to receive and pivotally connect one end of a link or yoke 36. A pivot bolt 37 is adapted to fit through the opening in the bearing ear 17 of the mounting clamp 14, and the head 38 of this pivot bolt is adapted to fit upon the upper side of the handle 30, so that the bolt will be turned as the handle is shifted laterally. A bearing member 39 is adapted to be fitted and held on the lower end of pivot bolt 37 beneath the bearing ear 17, and this bearing member 39 has downwardly projecting bearing ears 40 and 41 on opposite sides thereof, to receive the ends of the yoke or link 36.

With the modified construction, the mounting and operation will be substantially the same as is set forth above, and it will be appreciated that the clamp flanges 15 and 16 of the mounting clamp 14, in either construction, can be bent in or sprung out to accommodate the clamp to receive and fit upon windshield glasses of different thickness. To hold this clamp in place and to guard against the possibilities of chipping the edge of the glass, one or more strips of felt or other suitable material can be placed over the edge of the glass, or one or several layers of friction tape might be applied to the glass beneath this clamp. With the windshield glass 12 swung back from its alinement with the glass 11, the entire spotlight structure can be readily lifted from the glass as a trouble lamp, or in the preferred embodiment the clamp screw 27 can be loosened and stem 3 can be withdrawn forwardly from clamp ring 9, and in this latter disassembling of the parts, the casing 1 can be conveniently moved about and handled as a trouble lamp.

While I have herein shown and described only specific embodiments and have suggested only certain possible modifications, it will be appreciated that changes and variations can be made in the form and arrangement of the parts and in the mounting of the same, without departing from the spirit and scope of my invention.

I claim:

1. A spotlight support comprising a clamp member adapted to be mounted on the edge of a windshield glass and having a bearing thereon, a handle provided with an elongated slot, a light casing having a mounting for swinging movements at one end of said handle, a pivot mounting for the handle on said clamp member for swinging and sliding movements of the handle within the limits of the slot therein, and a link connected between said lamp casing and the bearing.

2. A spotlight support comprising a clamp member adapted to be mounted on the edge of a windshield glass and having a bearing thereon, a handle having an elongated slot therethrough and provided with a bearing portion at one end, a light casing having swinging mounting in the bearing portion of the handle, a bearing arm extending laterally from the light casing adjacent the swinging mounting thereof, a pivot bolt received through the slot of the handle by which the same is mounted for swinging and sliding movement on the clamp bearing, a second bearing carried by the pivot bolt, and a link connected between the second bearing member and the bearing arm of the light casing.

3. A spotlight support adapted for use upon a two-part windshield having the glasses thereof slightly separated, comprising a clamp member adapted to be fitted on the edge of one of the glasses at the point of separation, a bearing on said clamp, a handle adapted to be received between the separated windshield glasses provided with bearing arms at one end and a handle portion at the remaining end and having an elongated slot therethrough, a light casing mounted for swinging movement on said arms to swing on a horizontal axis, a bearing arm extending laterally on said casing at a point away from the swinging mounting thereof, a mounting bolt passed through the slot of the handle to mount the same on the bearing of the clamp for swinging and endwise sliding movement, a second bearing member carried by said bolt, and a link connected between the second bearing member and the bearing arm of the light casing.

4. A windshield spotlight support comprising a mounting clamp adapted to engage a portion of a windshield and provided with a bearing member to be disposed on one side of the windshield, a handle provided with an elongated slot in its middle portion, a pivot pin by which the handle is mounted upon the clamp for horizontal swinging movement and longitudinal sliding movement within the limits of the slot, a bearing at the outer end of the handle, a light casing mounted in said bearing for swinging movement through a substantially vertical path, and a link pivotally connected at one end with the mounting clamp bearing member and at its remaining end pivotally connected with the light casing at a point spaced vertically from the bearing on the handle.

In testimony whereof I hereunto affix my signature.

HERBERT E. VANDERVEER.